US009522582B2

(12) United States Patent
Cullen et al.

(10) Patent No.: US 9,522,582 B2
(45) Date of Patent: Dec. 20, 2016

(54) SYSTEMS AND METHODS FOR SETTING FRONT AXLE LOAD RESTORATION

(71) Applicant: FORD GLOBAL TECHNOLOGIES, LLC, Dearborn, MI (US)

(72) Inventors: James Gerard Cullen, Ypsilanti, MI (US); Ray Andrew Sackett, Novi, MI (US); Keith Weston, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 55 days.

(21) Appl. No.: 14/274,262

(22) Filed: May 9, 2014

(65) Prior Publication Data
US 2015/0323376 A1    Nov. 12, 2015

(51) Int. Cl.
| | | |
|---|---|---|
| *G01G 19/12* | (2006.01) | |
| *B60G 17/0195* | (2006.01) | |
| *B60D 1/24* | (2006.01) | |
| *G01G 23/18* | (2006.01) | |
| *B60D 1/30* | (2006.01) | |

(52) U.S. Cl.
CPC . *B60D 1/24* (2013.01); *B60D 1/30* (2013.01); *G01G 19/12* (2013.01); *G01G 23/18* (2013.01)

(58) Field of Classification Search
CPC . B60G 17/0152; B60G 17/017; B60G 17/018; B60G 11/27; B60G 17/0195; B60D 1/02; B60D 1/143; G01F 17/10; B60P 3/06
USPC ... 701/124, 38, 70; 280/124.1, 405.1, 5.514, 280/455.1; 340/440; 414/482
See application file for complete search history.

(56) References Cited

U.S. PATENT DOCUMENTS

| | | | | |
|---|---|---|---|---|
| 5,984,341 A | * | 11/1999 | Kass | B60D 1/143 280/406.1 |
| 6,142,500 A | * | 11/2000 | Sargent | B60D 1/02 280/405.1 |
| 6,537,014 B1 | * | 3/2003 | Ridgdill | B60P 3/06 280/425.1 |
| 2005/0080543 A1 | * | 4/2005 | Lu | B60G 17/018 701/70 |
| 2007/0296173 A1 | * | 12/2007 | Regnell | B60G 17/0152 280/124.1 |
| 2009/0069951 A1 | | 3/2009 | Liljeblad et al. | |

(Continued)

FOREIGN PATENT DOCUMENTS

| | | |
|---|---|---|
| EP | 1375207 A2 | 1/2004 |
| JP | 09-109645 A | 4/1997 |

(Continued)

OTHER PUBLICATIONS

"Weight Distribution", Auto Extra, Copyright 2013. http://www.towbarsperth.com.au/weight-distribution/.

*Primary Examiner* — Yuri Kan
(74) *Attorney, Agent, or Firm* — Jones Robb, PLLC; Raymond L. Coppiellie

(57) ABSTRACT

A system for setting front axle load restoration for a load distributing trailer hitch that is used to hitch a trailer to a motor vehicle may include at least one sensor associated with a wheel of the motor vehicle. The system may further include at least one controller configured to receive signals from the at least one sensor to estimate one or more corner weights of the motor vehicle based on the signals. The at least one controller may be configured to calculate a load restoration that is required at a front axle of the motor vehicle to achieve a recommended load restoration based on the one or more estimated corner weights.

28 Claims, 5 Drawing Sheets

(56) References Cited

U.S. PATENT DOCUMENTS

| | | | | |
|---|---|---|---|---|
| 2013/0057399 A1* | 3/2013 | Panse | ................... | B60G 17/017 340/440 |
| 2014/0350787 A1* | 11/2014 | Swanson | ............ | B60G 17/0195 701/38 |
| 2015/0251515 A1* | 9/2015 | Joachim | ................. | B60G 11/27 280/5.514 |

FOREIGN PATENT DOCUMENTS

| JP | 10-157434 A | 6/1998 |
|---|---|---|
| JP | 11-034630 A | 2/1999 |

\* cited by examiner

SYSTEMS AND METHODS FOR SETTING FRONT AXLE LOAD RESTORATION

TECHNICAL FIELD

The present disclosure relates generally to systems and methods for setting front axle load restoration. More specifically, the present disclosure relates to systems and methods for setting the front axle load restoration of a towing weight distribution system used with a motor vehicle.

BACKGROUND

When a trailer is coupled to a motor vehicle (i.e., a tow vehicle), the trailer's total tongue weight, or the portion of the trailer's total weight that presses down on a hitch of the tow vehicle, is applied directly onto a rear section of the tow vehicle between a rear axle of the vehicle and the hitch. If left uncorrected, the trailer may transfer weight from the front end of the tow vehicle and cause the vehicle's suspension to lift (see FIG. 4A). This weight transfer may cause trailer sway, reduced steering and braking responsiveness, less traction, and misaligned head lamps when the vehicle is towing the trailer.

Towing weight distribution systems, such as, for example, weight distributing trailer hitch systems, are designed to assist in restoring the geometry of the tow vehicle to its natural state. This may be achieved, for example, through spring bars coupled to the hitch that provide a lifting force to the rear of the tow vehicle, which may transfer the load exerted by the trailer correctly back over both axles of the tow vehicle. In other words, similar to the handles of a wheel barrow, the bars of the weight distributing hitch may lift the rear of the tow vehicle to restore a portion of the load to the front axle of the tow vehicle.

Such weight distributing trailer hitch systems may, for example, be adjusted to provide an appropriate amount of load restoration for a given trailer load. In this manner, prior to towing a trailer, a driver of the tow vehicle may set a front axle load restoration (FALR) for the weight distributing trailer hitch based, for example, on a manufacturer's recommended FALR (i.e., the amount of FALR recommended by the vehicle's manufacturer to restore the geometry of the vehicle to its natural state).

Properly setting the FALR for a weight distributing trailer hitch is, however, a difficult task for most drivers, who generally do not have access to vehicle scales that may accurately measure the amount of weight that is transferred from the front axle of the tow vehicle (i.e., to the rear axle) by the trailer. Accordingly, most drivers currently rely on imprecise measurement techniques, utilizing, for example, a tape measure to estimate a height change associated with a front wheel of the vehicle (e.g., a height change between a wheel lip and a front fender) to determine the required FALR.

It may, therefore, be advantageous to provide systems and methods for setting the FALR for a load distributing trailer hitch that are both accurate and simple to use. It may be further advantageous to provide systems and methods for setting the FALR which utilize existing vehicle sensors to calculate the required FALR for a driver.

SUMMARY

In accordance with various exemplary embodiments, a system for setting front axle load restoration for a load distributing trailer hitch that is used to hitch a trailer to a motor vehicle may include at least one sensor associated with a wheel of the motor vehicle. The system may further include at least one controller configured to receive signals from the at least one sensor to estimate one or more corner weights of the motor vehicle based on the signals. The at least one controller may be configured to calculate a load restoration that is required at a front axle of the motor vehicle to achieve a recommended load restoration based on the one or more estimated corner weights.

In accordance with various additional exemplary embodiments, a method for setting front axle load restoration for a load distributing trailer hitch that is used to hitch a trailer to a motor vehicle may include estimating at least one unloaded front corner weight of the motor vehicle with a controller of the motor vehicle and estimating at least one loaded front corner weight of the motor vehicle with the controller. The method may also include calculating a load restoration for a front axle of the motor vehicle, with the controller, based on a comparison of the unloaded and loaded front corner weights. The method may further include identifying a recommended adjustment to a load distributing trailer hitch, with the controller, based on the load restoration.

In accordance with various further exemplary embodiments, a system for setting front axle load restoration for a load distributing trailer hitch that is used to hitch a trailer to a motor vehicle may include a controller associated with the motor vehicle. The controller may be configured to estimate at least one unloaded front corner weight and at least one loaded front corner weight of the motor vehicle and calculate a load restoration for a front axle of the motor vehicle based on a comparison of the unloaded and loaded front corner weights. The controller may be further configured to identify a recommended adjustment to the load distributing trailer hitch based on the load restoration.

Additional objects and advantages of the disclosure will be set forth in part in the description which follows, and in part will be obvious from the description, or may be learned by practice of the disclosure. The objects and advantages of the disclosure will be realized and attained by means of the elements and combinations particularly pointed out in the appended claims.

It is to be understood that both the foregoing general description and the following detailed description are exemplary and explanatory only and are not restrictive of the disclosure, as claimed.

The accompanying drawings, which are incorporated in and constitute a part of this specification, illustrate embodiments of the disclosure and together with the description, serve to explain the principles of the disclosure.

BRIEF DESCRIPTION OF THE DRAWINGS

At least some features and advantages will be apparent from the following detailed description of embodiments consistent therewith, which description should be considered with reference to the accompanying drawings, wherein.

Figure 1:
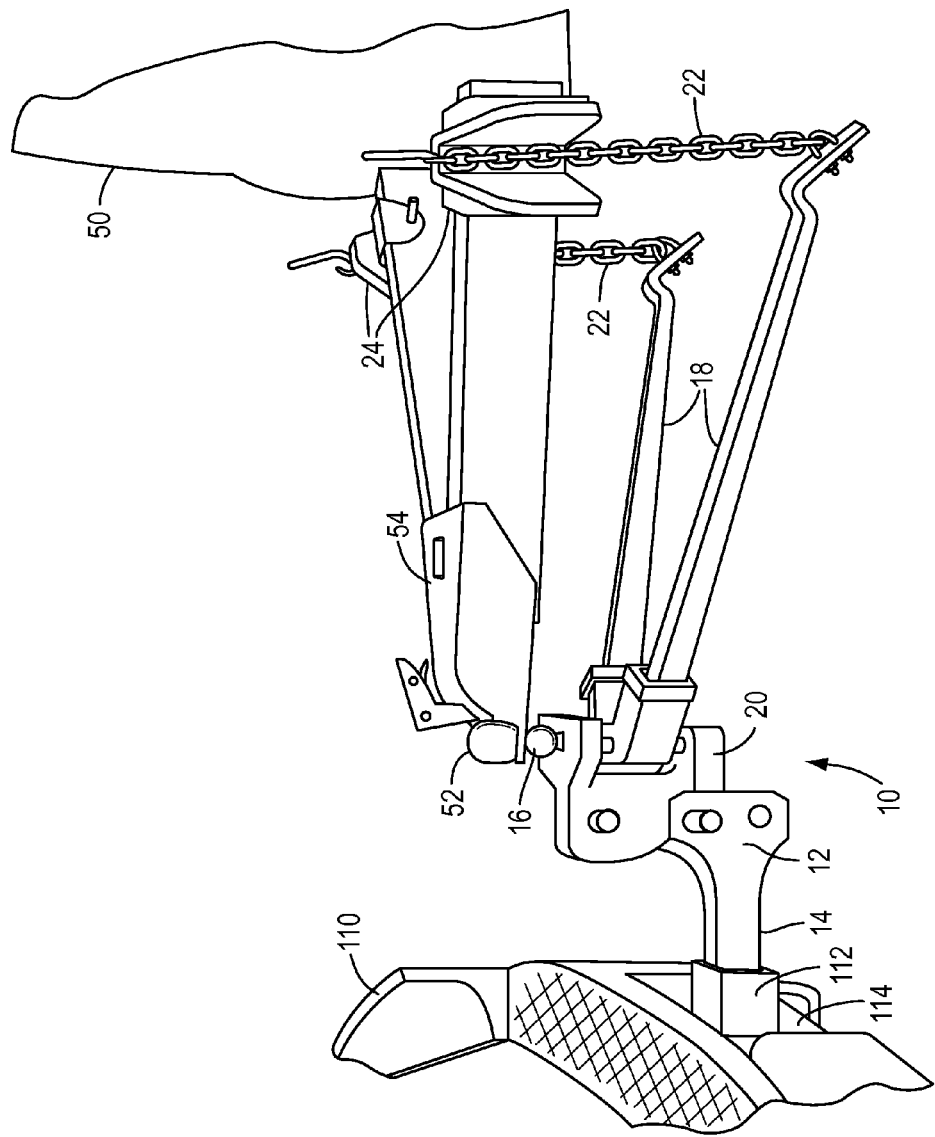
FIG. 1 is a perspective view illustrating a trailer hitched to a motor vehicle via an exemplary embodiment of a load distributing trailer hitch in accordance with the preset disclosure.

Although the following detailed description makes reference to illustrative embodiments, many alternatives, modifications, and variations thereof will be apparent to those skilled in the art. Accordingly, it is intended that the claimed subject matter be viewed broadly.

DESCRIPTION OF THE EMBODIMENTS

Reference will now be made in detail to various embodiments, examples of which are illustrated in the accompanying drawings. The various exemplary embodiments are not intended to limit the disclosure. To the contrary, the disclosure is intended to cover alternatives, modifications, and equivalents.

In accordance with various exemplary embodiments, the present disclosure contemplates systems and methods for setting front axle load restoration (FALR) for a load distributing trailer hitch that is used, for example, to hitch a trailer to a motor vehicle. For instance, the embodiments described herein may utilize existing vehicle sensors to calculate the load restoration that is required at a front axle of the vehicle to achieve a load restoration that is recommended by the vehicle's manufacturer. Various embodiments described herein, for example, contemplate a system for setting FALR comprising at least one sensor associated with a wheel of the motor vehicle, such as, for example, a height sensor and/or an air spring transducer, and at least one controller configured to receive the signals from the at least one sensor and calculate a required FALR based on the signals, and methods which utilize such systems.

In various embodiments, to calculate the required FALR, the controller is configured to estimate one or more corner weights of the motor vehicle based on the signals received from the one or more sensors. In various embodiments, for example, the controller is configured to estimate the front corner weights of the vehicle based on signals received from height sensors and/or air spring pressure transducers associated with each of the front wheels of the vehicle and calculate a load restoration that is required at a front axle of the vehicle to achieve a recommended load restoration at the front axle (i.e., the required FALR) based on the estimated corner weights. In accordance with various embodiments, for example, the controller is configured to estimate the corner weights of the vehicle both before a trailer is hitched to the vehicle (i.e., the unloaded front corner weights) and after the trailer is hitched to the vehicle (i.e., the loaded front corner weights).

To calculate the required FALR, the controller is further configured to compare each estimated unloaded front corner weight with each respective estimated loaded front corner weight. A driver may then install and adjust the load bars of the load distributing hitch in accordance with the calculated FALR. To verify that the load bars were properly adjusted (i.e., to achieve the recommended FALR), in various additional embodiments, the controller may be further configured to again estimate the corner weights of the vehicle after the load bars are adjusted (i.e., the restored front corner weights) and recommend to the driver whether or not the load bars need further adjustment to achieve the recommended FALR.

In this manner, embodiments of the present disclosure may utilize existing vehicle height sensors (i.e., associated with a vehicle having a coil suspension) and/or air spring pressure transducers (i.e., associated with a vehicle having an air suspension) to calculate the required FALR for the driver. Embodiments of the present disclosure, however, also contemplate a system including additional sensors as needed to provide the signal inputs used in the systems and methods of the present disclosure.

As used herein, the term "corner weight" and variations thereof refers to a weight that would register at each corner of the motor vehicle if the vehicle was driven onto a surface such that each tire was on a different scale. In other words, the corner weights of the vehicle correspond to the weights registered by each scale. Thus, as used herein, the term "unloaded corner weights" refers to the weights that would register before a trailer is hitched to the vehicle; the term "loaded corner weights" refers to the weights that would register after a trailer is hitched to the vehicle; and "restored corner weights" refers to the weights that would register after load bars of a load distributing trailer hitch are installed and adjusted.

FIG. 1 is a perspective view illustrating a trailer 50 hitched to a motor vehicle 110 via an exemplary embodiment of a load distributing trailer hitch 10 in accordance with the present disclosure. As shown in FIG. 1, the hitch 10 includes a hitch bar 12 including a tubular mounting post 14 for engagement in a receiver box 112 of a hitch receiver 114 mounted to the motor vehicle 110. A distal end of the hitch bar 12 includes a ball mount head 20 with an adjustable ball mount 16 for engagement in a coupler 52 of a tongue 54 of the trailer 50. In this manner, as illustrated in FIG. 1, the hitch 10 is configured to couple the trailer 50 to the vehicle 110.

The hitch 10 also includes a pair of load bars, such as, for example, spring bars 18, which run from the ball mount head 20 to a pair of chains 22. As shown in FIG. 1, the chains 22 hang from a pair of brackets 24 that are affixed to the tongue 54 of the trailer 50. In this manner, when the chains 22 are attached to the spring bars 18, the chains 22 create tension on the spring bars 18. Thus, when the tongue weight pushes down on the spring bars 18, the chains 22 help to pull the spring bars 18 back up. The spring bars 18 then push up on the ball mount head 20, which in turn provides FALR by re-distributing the tongue weight between the axles of the vehicle 110.

As would be understood by those of ordinary skill in the art, the FALR provided by the trailer may, therefore, be adjusted by selection of the tilt angle of the ball mount head 20 and the engagement of different links of the chains 22 (i.e., to create different amounts of tension on the spring bars 18).

Figure 2:
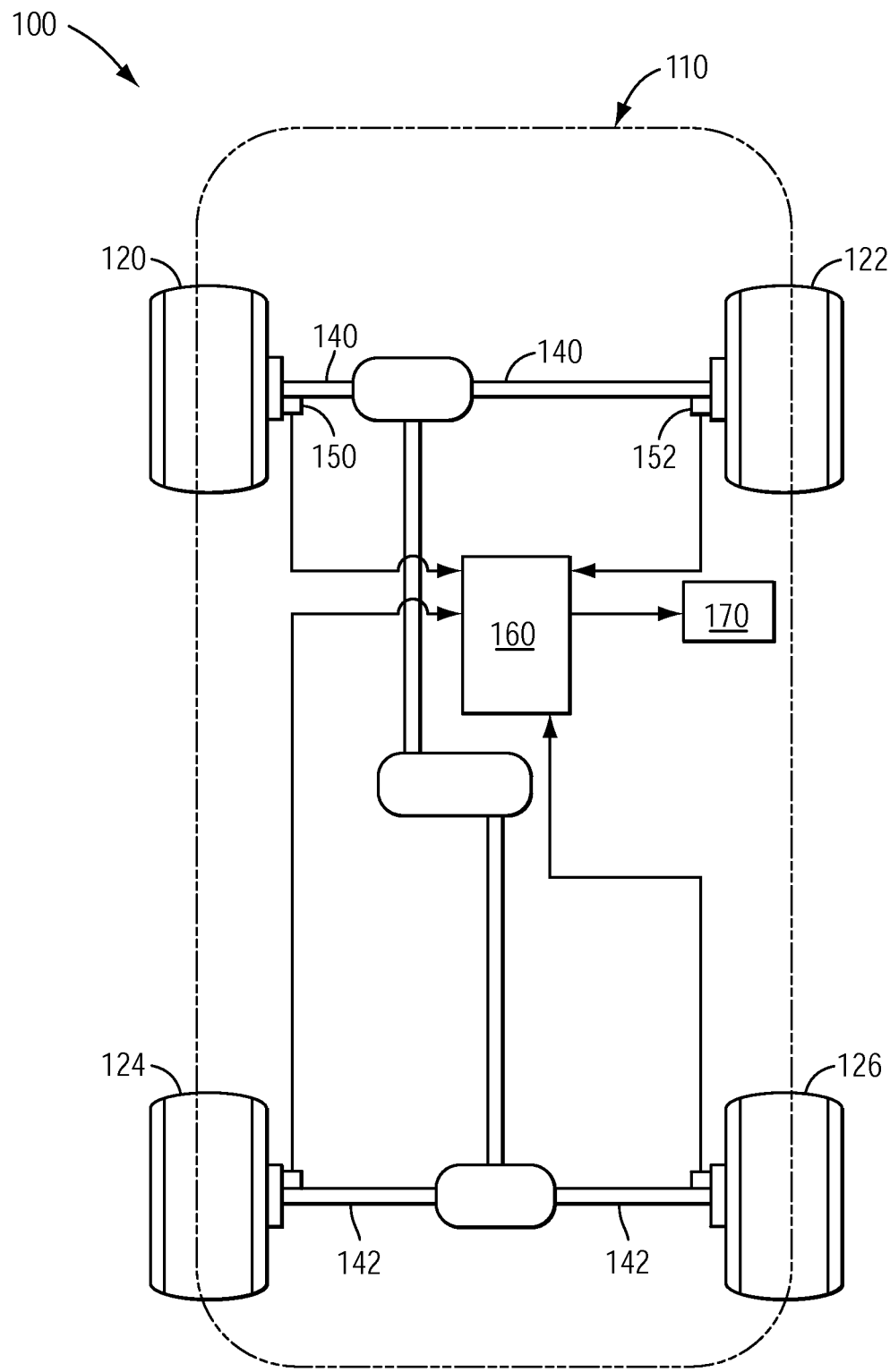
FIG. 2 is a schematic diagram illustrating an exemplary embodiment of a system for setting FALR, for the trailer hitch of FIG. 1, in accordance with the present disclosure.
Figure 3:
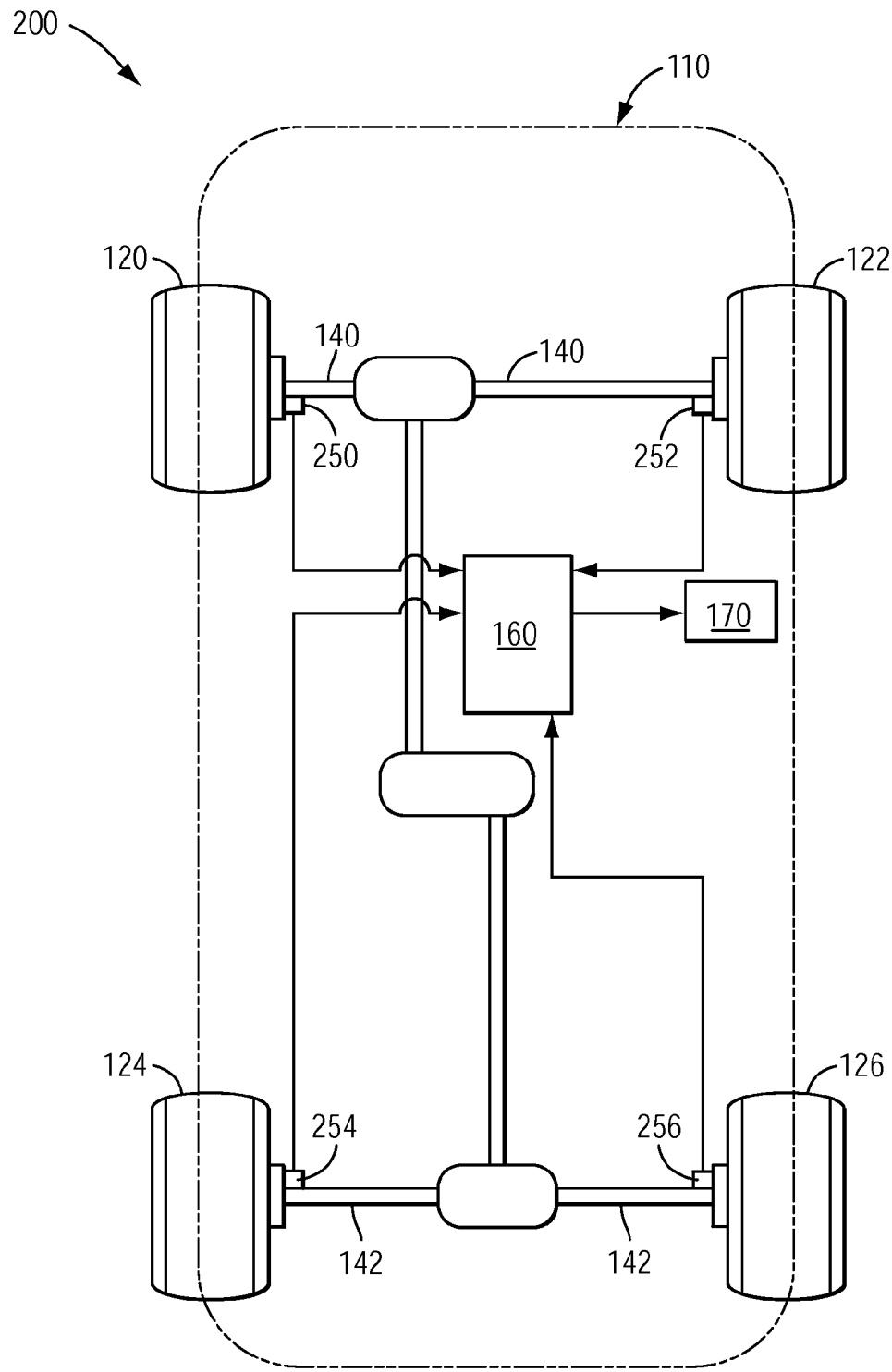
FIG. 3 is a schematic diagram illustrating another exemplary embodiment of a system for setting FALR, for the trailer hitch of FIG. 1, in accordance with the present disclosure.

FIGS. 2 and 3 are schematic diagrams respectively illustrating some structural elements of an exemplary embodiment of a system 100 and a system 200 for setting FALR for a load distributing trailer hitch, such as, for example, the trailer hitch 10 of FIG. 1. As illustrated in FIGS. 2 and 3, the vehicle 110 may have wheels 120, 122, 124, and 126. Front wheel 120 is mounted on the left side of a front axle 140 and front wheel 122 is mounted on the right side of the front axle 140. Rear wheel 124 is mounted on the left side of a rear axle 142 and rear wheel 126 is mounted on the right side of the rear axle 142.

As explained further below, the systems 100, 200 include at least one sensor associated with one or more of the wheels 120, 122, 124, and 126, and at least one controller, such as, for example, controller 160 that is configured to receive signals from the at least one sensor to estimate one or more corner weights of the vehicle 110. The controller 160 is further configured to calculate a load restoration that is required at the front axle 140 of the motor vehicle 110 (i.e., a required FALR) to achieve a recommended load restoration (i.e., a recommended FALR) based on the one or more estimated corner weights. In various embodiments, for example, the recommended FALR is determined by the manufacturer of the vehicle 110.

In various additional embodiments, the systems 100, 200 may further include a notification system 170 that is configured to receive a signal from the controller 160 and indicate to an observer, such as, for example, a user or driver of the vehicle 110 to install and set the FALR of the trailer hitch 10 based on the required FALR; and, once the load bars of the trailer hitch 10 are installed, whether or not the FALR provided by the hitch 10 needs to be increased or decreased to achieve the recommended FALR. The notification system 170 can, for example, audibly and/or visually indicate instructions and/or recommendations to the driver. As would be understood by those of ordinary skill in the art, the notification system 170 can include, for example, indicator lights or an LCD that is displayed on the vehicle's console, instrument cluster, navigation/camera touch screen user interface, rearview mirror, or another location that is easily viewable by the driver. In various embodiments, the notification system 170 may also be configured to receive inputs from the driver of the motor vehicle, for example, to indicate to the controller 160 when the load bars of the trailer hitch 10 have been installed and/or adjusted. In this manner the notification system 170 may include, for example, buttons, switches, and/or a touch pad configured for use by the driver.

As illustrated in FIG. 2, in various exemplary embodiments wherein the vehicle 110 has a coil suspension, the system 100 may include height sensors, such as, for example, front ride heights sensors 150, 152, wherein each height sensor is associated with a respective front wheel 120, 122 of the vehicle 110. As would be understood by those of ordinary skill in the art, each height sensor 150, 152 is mounted with respect to each wheel 120, 122 via a coil suspension spring (not shown), and may measure the relative displacement of each suspension spring (i.e., to determine the relative position of the vehicle 110's body with respect to each wheel 120, 122). The controller 160 may, therefore, receive signals from the height sensors 150, 152 to estimate the front corner weights of the vehicle 110 by calculating a load F on each suspension spring:

$$F=k(d) \quad (1)$$

wherein k is the spring rate associated with each spring (which may be stored, for example, within a memory of the controller 160) and d is the measured displacement of each spring.

As illustrated in FIG. 3, in various additional embodiments wherein the vehicle 110 has an air suspension, the system 200 may include air spring pressure transducers 250, 252, 254, 256 wherein each transducer is associated with a respective wheel 120, 122, 124, 126 of the vehicle 110. As would also be understood by those of ordinary skill in the art, each air spring pressure transducer 250, 252, 254, 256 is mounted with respect to each wheel 120, 122, 124, 126 via an air suspension spring (not shown), and may measure the pressure within each suspension spring (i.e., to determine the relative position of the vehicle 110's body with respect to each wheel 120, 122, 124, 126). Similar to the system 100 of FIG. 2, the controller 160 may receive signals from the transducers 250, 252 (which are associated with the front wheels 120, 122 of the vehicle 110) to estimate the front corner weights of the vehicle 110 by calculating the load F on each of the front suspension springs using equation (1) above.

Those of ordinary skill in the art would understand that the systems 100, 200 for setting FALR illustrated in FIGS. 2 and 3 are exemplary only and intended to illustrate two embodiments of the present disclosure. Accordingly, systems for setting FALR, for a load distributing hitch, in accordance with the present disclosure may have various types, numbers and/or configurations of wheels, controllers, and/or sensors without departing from the scope of the present disclosure and claims. The controller 160 may include, for example, an existing vehicle controller such as the Electronic Control Unit (ECU) of the vehicle 110, or a dedicated controller, or control may be distributed among more than one vehicle controller.

Furthermore, although the system 100 illustrated and described with reference to FIG. 2 includes two ride height sensors 150, 152 (one height sensor for each of the front wheels 120, 122), various additional embodiments of the present disclosure contemplate a system that has four ride height sensors (one height sensor for each of the wheels 120, 122, 124, 126). Conversely, although the system 200 illustrated with reference to FIG. 3 includes four air spring pressure transducers 250, 252, 254, 256 (one transducer for each of the wheels 120, 122, 124, 126), various additional embodiments of the present disclosure contemplate a system that has only two air spring pressure transducers 250, 252 (one transducer for each of the front wheels 120, 122).

As above, to calculate the required FALR to achieve the recommended FALR, in various embodiments, the controller 160 may first estimate the unloaded front corner weights of the vehicle 110 (i.e., before the trailer 50 is hitched to the motor vehicle 110 with the hitch 10) based on the signals received from the sensors (e.g., heights sensors 150, 152 or transducers 250, 252). In various embodiments, for example, the controller 160 may store a value for each of the estimated unloaded front corner weights in a memory (not shown) and direct the driver via the notification system 170 to install the trailer 50. The controller 160 may then estimate the loaded front corner weights of the vehicle 110 and store a value for each of the estimated loaded front corner weights in the memory.

Figure 4A:
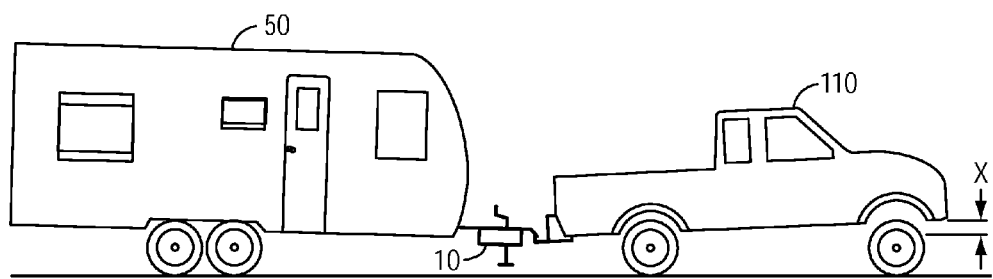
FIG. 4A is a plan view illustrating vehicle level with about 0% FALR.
Figure 4B:
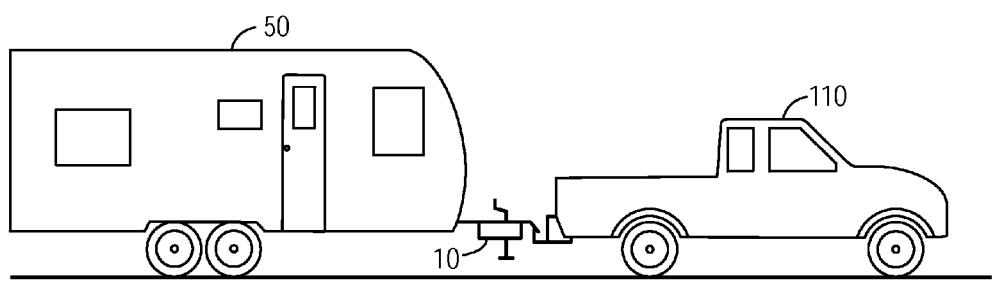
FIG. 4B is a plan view illustrating vehicle level with about 100% FALR.

The controller 160 may then compare the estimated unloaded front corner weights with the estimated loaded front corner weights to calculate the required FALR based on the recommended FALR. In other words, the required FALR to achieve the manufacturer's recommended FALR may be determined based on a difference between the unloaded and loaded front corner weights of the vehicle 110 (a weight difference representing the estimated amount of weight transferred from the front axle 140 by the trailer 50). As illustrated in FIG. 4A, if left uncorrected, with no FALR (i.e., approximately 0% FALR), this weight transfer will cause the front end of the vehicle 110 to lift by an amount X. Conversely, with full load restoration (i.e., approximately 100% FALR), the weight transfer is completely reversed (to correct the difference in front corner weights), thereby restoring the vehicle 110 to its original geometry, as shown in FIG. 4B.

As would be understood by those of ordinary skill in the art, to provide an optimal towing geometry for the vehicle 110, the manufacturer's recommended FALR may, however, fall somewhere in between approximately 0% FALR and approximately 100% FALR, such as, for example, approximately 25%, approximately 50%, or approximately 75% FALR. Thus, the controller 160 may calculate and store the required FALR (or the amount of weight that needs to be restored to the front axle 140) to achieve the recommended percentage, and may indicate to the driver (e.g., via the notification system 170) to install and adjust the spring bars 18 of the weight distributing trailer hitch 10 based on the required FALR. For example, if the recommended FALR is approximately 50%, the controller 160 would indicate to adjust the spring bars 18 of the hitch 10 to restore one half of the estimated weight transfer; and if the recommended FALR is approximately 75%, the controller 160 would indicate to adjust the spring bars 18 of the hitch 10 to restore three quarters of the estimated weight transfer.

To verify that the recommended FALR has been achieved (i.e., that the spring bars 18 of the hitch 10 have been set to provide the proper amount of load restoration), in various embodiments of the present disclosure, the controller 160 may also estimate the restored front corner weights of the vehicle 110 based on the signals received from the sensors (e.g., heights sensors 150, 152 and/or transducers 250, 252), and compare the estimated restored front corner weights with the estimated loaded front corner weights to determine the amount of weight that was restored by the hitch 10. In other words, the difference between the corner weights (restored vs. loaded) corresponds to the amount of weight restoration provided by the spring bars 18. The controller 160 may compare this weight difference to the recommended FALR to determine whether or not the spring bars 18 need further adjustment. If the weight difference exceeds the recommended FALR, for example, the controller 160 may recommend (e.g., via the notification system 170) adjusting the spring bars 18 to provide less tension. And, if the weight difference does not meet the recommended FALR, the controller 160 may recommend adjusting the spring bars 18 to provide more tension. In various embodiments, the controller 160 may repeat this verification process until the recommended FALR is obtained.

Figure 5:
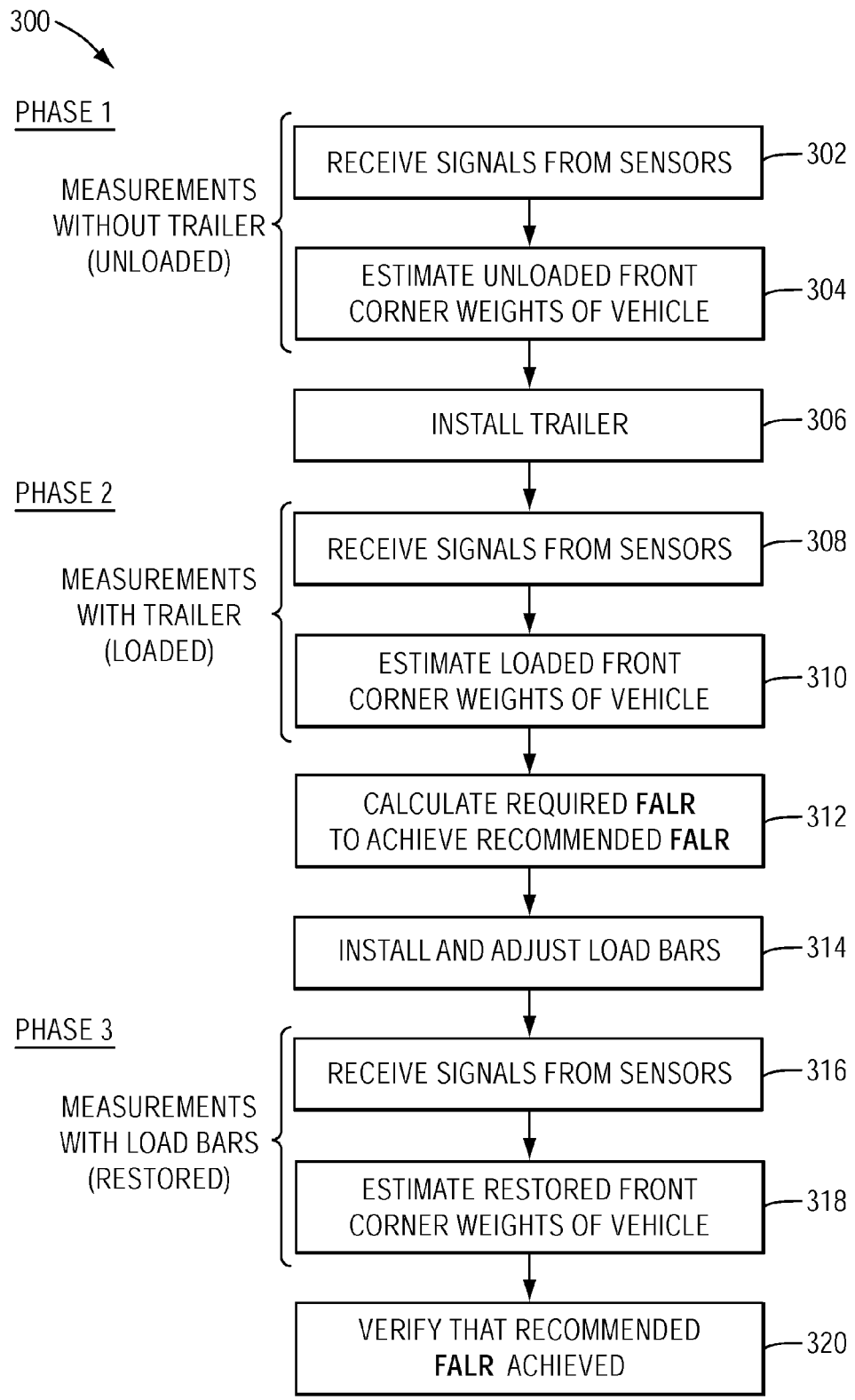
FIG. 5 is a flow chart illustrating an exemplary embodiment of a method for setting FALR, for a load distributing trailer hitch, in accordance with the present disclosure.

FIG. 5 shows a flow diagram depicting an exemplary embodiment of a method 300 for setting FALR using, for example, the above described systems 100, 200. As illustrated in FIG. 5, in various exemplary embodiments, the method 300 generally includes three phases of measurements to calculate a required FALR (e.g., the load restoration that is required at a front axle 140 of a motor vehicle 110) to achieve a recommended FALR: (1) measurements taken before a trailer (e.g., a trailer 50) is hitched to the vehicle 110; (2) measurements taken after the trailer 50 is hitched to the vehicle 110 via a load distributing trailer hitch (e.g., a hitch 10); and (3) measurements taken after load bars (e.g., spring bars 18) of the hitch 10 are installed and adjusted.

In the first phase, as shown in steps 302 and 304, the controller 160 may receive one or more signals associated with a front wheel of the motor vehicle 110, and estimate at least one front corner weight of the motor vehicle 110 based on the one or more signals. In various embodiments, for example, the controller 160 may receive signals corresponding to a height of the front wheels of the vehicle 110 (e.g., from ride height sensors 150, 152). In various additional embodiments, the controller 160 may receive signals corresponding to a pressure in the front air springs of the motor vehicle 110 (e.g., from air spring pressure transducers 250, 252). As above, in step 304, the controller 160 may estimate the front corner weights of the vehicle 110 (the unloaded front corner weights) based on the signals by calculating a load F on each suspension spring using equation (1) above.

In step 306, a user, such as, for example, a driver of the vehicle 110 is directed to install and hitch the trailer 50 to the motor vehicle 110 with the load distributing hitch 10, thus initiating the second phase of measurements. In various embodiments, for example, a notification system in communication with the controller 160 (e.g., a notification system 170) may indicate to the user to install the trailer 50. In the second phase, as shown in steps 308 and 310, the controller 160 may then again receive signals associated with the front wheels of the motor vehicle 110 (e.g., from ride height sensors 150, 152 and/or air spring pressure transducers 250, 252), and estimate the front corner weights (the loaded front corner weights) of the motor vehicle 110 based on the signals by calculating a load F on each suspension spring using equation (1) above.

In step 312, the controller 160 may then calculate a load restoration for a front axle 140 of the motor vehicle 110 and identify a recommended adjustment to the load distributing trailer hitch 10 based on the load restoration. In various embodiments, for example, the controller may calculate a required load restoration (a required FALR) to achieve a recommend load restoration (a recommended FALR) that is predetermined, for example, by the manufacturer of the motor vehicle 110. In various embodiments, for example, the controller 160 may calculate the required FALR based on the estimated front corner weights by comparing the estimated unloaded and loaded front corner weights. As described above, the required FALR to achieve the recommended FALR may be determined, for example, based on the difference between the unloaded and loaded front corner weights of the vehicle 110, which represents the amount of weight transferred from the front axle 140 of the vehicle 110 by the trailer 50 (the estimated weight transfer). In other words, the controller 160 may identify the recommended adjustment to the load distributing trailer hitch 10 (e.g., via the load bars 18 to compensate for the estimated weight transfer) based on the required FALR. In various embodiments, for example, the notification system 170 may notify the driver of the recommended adjustment.

As above, the driver may then adjust the load distributing trailer hitch 10 based on the recommended adjustment. In step 314, for example, the driver of the vehicle 110 is directed to install and adjust the spring bars 18 of the hitch 10 (e.g., via the notification system 170) to provide a desired amount of tension based on the required FALR, thus initiating the third phase of measurements. In the third phase, as shown in steps 316 and 318, the controller 160 may then again receive signals associated with the front wheels of the motor vehicle 110 (e.g., from ride height sensors 150, 152 and/or air spring pressure transducers 250, 252), and estimate the front corner weights (the restored front corner weights) of the motor vehicle 110 based on the signals by calculating a load F on each suspension spring using the equation (1) above.

In step 320, the controller 160 may verify that the spring bars were adjusted properly to achieve the recommended FALR. In various embodiments, for example, the controller 160 may compare the estimated restored and loaded front corner weights to determine a load restoration that is provided by the load distributing trailer hitch 10 (i.e., the provided FALR or the amount of weight restored to the front axle 140 by the hitch 10). As described above, the difference between the corner weights (restored vs. loaded) corresponds to the amount of weight restoration provided by the spring bars 18. Thus, the controller 160 may compare this weight difference to the recommended FALR to determine whether or not the spring bars 18 need further adjustment. In various embodiments, for example, the controller 160 may identify an additional recommended adjustment to the load distributing trailer hitch 10 if the provided FALR does not equal the recommended FALR.

In various embodiments, the notification system 170 may notify the driver if an additional recommended adjustment is required (i.e., if the recommended FALR has not been achieved), and may recommend additional adjustment of the load bars 18 of the trailer hitch 10 to provide either more load restoration or less load restoration based on the weight difference. If the weight difference exceeds the recommended FALR, for example, the notification system 170 may recommend adjusting the spring bars 18 of the hitch 10 to provide less tension. And, if the weight difference does not meet the recommended FALR, the notification system 170 may recommend adjusting the spring bars 18 of the hitch 10 to provide more tension. In various additional embodiments, the controller 160 may run through this verification process (phase 3) until the recommended FALR is obtained.

Those of ordinary skill in the art would understand that the method 300 illustrated in the embodiment of FIG. 5 is exemplary only and intended to illustrate one embodiment of a method for setting FALR in accordance with the present disclosure. Accordingly, methods in accordance with the present disclosure may have various numbers and/or arrangements of steps which utilize signals associated with one or more front wheels of a vehicle to estimate the front corner weights of the vehicle without departing from the scope of the present disclosure and claims.

While the present disclosure has been disclosed in terms of exemplary embodiments in order to facilitate better understanding of the disclosure, it should be appreciated that the disclosure can be embodied in various ways without departing from the principle of the disclosure. Therefore, the disclosure should be understood to include all possible embodiments which can be embodied without departing from the principle of the disclosure set out in the appended claims. The present teachings as disclosed work equally well for coil and air suspensions, being independent of vehicle suspension type. Furthermore, although the present disclosure has been discussed with relation to automotive vehicles, for example, having four wheels, with ride height sensors and/or air spring pressure transducers, those of ordinary skill in the art would understand that the present teachings as disclosed would work equally well for any type of vehicle having one or more sensors associated with the wheels of the vehicle that may be used to determine the front corner weights of the vehicle.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the written description and claims are approximations that may vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques.

It is noted that, as used in this specification and the appended claims, the singular forms "a," "an," and "the," include plural referents unless expressly and unequivocally limited to one referent. Thus, for example, reference to "a sensor" includes two or more different sensors. As used herein, the term "include" and its grammatical variants are intended to be non-limiting, such that recitation of items in a list is not to the exclusion of other like items that can be substituted or added to the listed items.

It will be apparent to those skilled in the art that various modifications and variations can be made to the system and method of the present disclosure without departing from the scope its teachings. Other embodiments of the disclosure will be apparent to those skilled in the art from consideration of the specification and practice of the teachings disclosed herein. It is intended that the specification and embodiment described herein be considered as exemplary only.

What is claimed is:

1. A system for setting front axle load restoration for a load distributing trailer hitch used to hitch a trailer to a motor vehicle, comprising:
    at least one sensor associated with a wheel of the motor vehicle; and
    at least one controller configured to receive signals from the at least one sensor to estimate one or more corner weights of the motor vehicle based on the signals,
    wherein the at least one controller is configured to calculate a load restoration that is required at a front axle of the motor vehicle to achieve a recommended load restoration based on the one or more estimated corner weights.

2. The system of claim 1, wherein the at least one sensor comprises a height sensor.

3. The system of claim 1, wherein the at least one sensor comprises an air spring pressure transducer.

4. The system of claim 1, wherein the recommended load restoration is predetermined by the vehicle's manufacturer.

5. The system of claim 1, wherein the at least one sensor comprises one or more sensors associated with each front wheel of the motor vehicle, and wherein the at least one controller is configured to receive signals from the one or more sensors associated with each front wheel of the motor vehicle to estimate a corner weight associated with each front wheel of the motor vehicle.

6. The system of claim 1, wherein the at least one controller is configured to estimate one or more unloaded corner weights of the motor vehicle based on the signals from the at least one sensor.

7. The system of claim 6, wherein the at least one controller is configured to estimate one or more loaded corner weights of the motor vehicle based on the signals from the at least one sensor.

8. The system of claim 7, wherein the at least one controller is configured to compare each estimated unloaded corner weight with each respective estimated loaded corner weight to calculate the load restoration.

9. The system of claim 8, wherein the controller is further configured to estimate one or more restored corner weights of the motor vehicle based on the signals from the at least one sensor.

10. The system of claim 9, wherein the controller is configured to compare each estimated restored corner weight with each respective estimated loaded corner weight to determine whether the load distribution hitch needs further adjustment to achieve the recommended load restoration.

11. The system of claim 1, further comprising a notification system configured to indicate to a user to set a load restoration of the load distributing trailer hitch based on the calculated load restoration.

12. A method for setting front axle load restoration for a load distributing trailer hitch used to hitch a trailer to a motor vehicle, comprising:
- before the trailer is hitched to the motor vehicle, estimating at least one unloaded front corner weight of the motor vehicle with a controller of the motor vehicle;
- after the trailer is hitched to the motor vehicle, estimating at least one loaded front corner weight of the motor vehicle with the controller;
- calculating a load restoration for a front axle of the motor vehicle, with the controller, based on a comparison of the unloaded and loaded front corner weights; and
- identifying a recommended adjustment to a load distributing trailer hitch, with the controller, based on the load restoration.

13. The method of claim 12, further comprising receiving one or more signals associated with a front wheel of the motor vehicle, and
wherein estimating the unloaded and loaded front corner weights comprises estimating the unloaded and loaded front corner weights based on the one or more signals.

14. The method of claim 13, wherein receiving the one or more signals comprises receiving one or more signals indicative of a height of the front wheel of the motor vehicle.

15. The method of claim 13, wherein receiving the one or more signals comprises receiving one or more signals indicative of a pressure in a front air spring of the motor vehicle.

16. The method of claim 12, further comprising notifying a user of the recommended adjustment with a notification system in communication with the controller.

17. The method of claim 16, wherein notifying the user of the recommended adjustment comprises recommending adjustment of load bars of the trailer hitch to provide a desired amount of tension.

18. The method of claim 12, wherein calculating the load restoration comprises calculating a required load restoration to achieve a recommended load restoration that is predetermined by the vehicle's manufacturer.

19. The method of claim 18, further comprising estimating at least one restored front corner weight of the motor vehicle.

20. The method of claim 19, further comprising comparing the restored and loaded front corner weights to determine a load restoration that is provided by the load distributing trailer hitch.

21. The method of claim 20, further comprising identifying an additional recommended adjustment to the load distributing trailer hitch, with the controller, if the provided load restoration does not equal the recommended load restoration.

22. The method of claim 21, further comprising notifying a user of the additional recommended adjustment with a notification system in communication with the controller, wherein notifying the user of the additional recommended adjustment comprises recommending additional adjustment of load bars of the trailer hitch to provide either more load restoration or less load restoration.

23. The method of claim 22, wherein recommending additional adjustment of the load bars comprises recommending adjustment of the load bars to provide either more tension or less tension.

24. A system for setting front axle load restoration for a load distributing trailer hitch used to hitch a trailer to a motor vehicle, comprising:
- a controller associated with the motor vehicle, wherein the controller is configured to estimate at least one unloaded front corner weight of the motor vehicle before the trailer is hitched to the motor vehicle and at least one loaded front corner weight of the motor vehicle after the trailer is hitched to the motor vehicle and calculate a load restoration for a front axle of the motor vehicle based on a comparison of the unloaded and loaded front corner weights,
- wherein the controller is further configured to identify a recommended adjustment to the load distributing trailer hitch based on the load restoration.

25. The system of claim 24, wherein the controller is configured to calculate the load restoration based on a required load restoration to achieve a recommended load restoration that is predetermined by the vehicle's manufacturer.

26. The system of claim 24, wherein the controller is configured to estimate the unloaded and loaded front corner weights based on signals received from one or more signals associated with a front wheel of the motor vehicle.

27. The system of claim 26, wherein the controller is configured to estimate the unloaded and loaded front corner weights based one or more signals indicative of a height of the front wheel of the motor vehicle.

28. The system of claim 26, wherein the controller is configured to estimate the unloaded and loaded front corner weights based one or more signals indicative of a pressure in a front air spring of the motor vehicle.

* * * * *